United States Patent
Frank et al.

(10) Patent No.: US 6,832,120 B1
(45) Date of Patent: Dec. 14, 2004

(54) SYSTEM AND METHODS FOR OBJECT-ORIENTED CONTROL OF DIVERSE ELECTROMECHANICAL SYSTEMS USING A COMPUTER NETWORK

(75) Inventors: Gerald L. Frank, Richmond, VA (US); Danny J. Wahlquist, Jr., Richmond, VA (US); Brian S. Frank, Richmond, VA (US); John W. Sublett, Richmond, VA (US); Daniel P. Giorgis, Glen Allen, VA (US); William G. Rockwell, Jr., Richmond, VA (US); Ottie E. Allgood, Mechanisville, VA (US); Robert A. Adams, Midlothian, VA (US)

(73) Assignee: Tridium, Inc., Richmond, VA (US)

( * ) Notice: Subject to any disclaimer, the term of this patent is extended or adjusted under 35 U.S.C. 154(b) by 0 days.

(21) Appl. No.: 09/313,415

(22) Filed: May 14, 1999

Related U.S. Application Data

(60) Provisional application No. 60/085,539, filed on May 15, 1998.

(51) Int. Cl.$^7$ .............................................. G05B 19/18
(52) U.S. Cl. .............................. 700/65; 700/9; 700/17; 700/83; 700/79; 700/87; 709/217; 709/224; 709/229
(58) Field of Search ................................ 700/65, 9, 17, 700/83, 79, 87; 709/217, 224, 229

(56) References Cited

U.S. PATENT DOCUMENTS

| 5,249,270 | A |   | 9/1993 | Stewart et al. |
|---|---|---|---|---|
| 5,297,257 | A |   | 3/1994 | Struger et al. |
| 5,398,336 | A |   | 3/1995 | Tantry et al. |
| 5,550,980 | A |   | 8/1996 | Pascucci et al. |
| 5,598,566 | A |   | 1/1997 | Pascucci et al. |
| 5,718,767 | A |   | 2/1998 | Crum et al. |
| 5,805,442 | A |   | 9/1998 | Crater et al. |
| 5,862,052 | A | * | 1/1999 | Nixon et al. .................... 713/1 |
| 6,047,222 | A | * | 4/2000 | Burns et al. ................... 700/79 |
| 6,067,477 | A | * | 5/2000 | Wewalaarachchi et al. ... 700/83 |
| 6,119,125 | A |   | 9/2000 | Gloudeman et al. |
| 6,157,943 | A |   | 12/2000 | Meyer |
| 6,189,109 | B1 | * | 2/2001 | Sheikh et al. ................... 714/1 |
| 6,370,448 | B1 | * | 4/2002 | Eryurek ...................... 700/282 |

OTHER PUBLICATIONS

Chen, Ping–Wen; Barry, Greg; and Chang, Shi–Kuo, "A Smart WWW Page Model and its Application to On–line Information Retrieval in Hyperspace," research paper, presented on Jun. 27, 1996 as part of the 1996 Pacific Workshop on Distributed Media Systems, Knowledge Systems Institute.

(List continued on next page.)

Primary Examiner—Anthony Knight
Assistant Examiner—Thomas Pham
(74) Attorney, Agent, or Firm—Darby & Darby

(57) ABSTRACT

A control system methodology that uses object-oriented software to integrate multiple control systems into a common object model. Object-oriented techniques are used to construct distributed applications in a multi-vendor open system environment for use in controlling and monitoring systems of varying size and configuration. Information is brought into a common object model and made available throughout the system. A custom programming language is included for object creation. Access to objects is controlled through a multi-level security protocol. Data flow is governed by a real-time information synchronization manager. Classes are used to implement the system in a platform independent way according to a "core class hierarchy" in which objects are organized to inherit behavior and perform predictably. A control engine allows the user to control the order of execution of objects. A script is provided for generating custom objects.

3 Claims, 11 Drawing Sheets

OTHER PUBLICATIONS

Akio Orihara et al., "An Autonomous Decentralized System Platform Under Multi–vendor Environments in Building Automation," article, Apr. 1997, IEEE.

Yoshikazu Nakanishi, "Development of a Seamless Connection Technology Between Information Networks and Control Networks Using Java Language," Shikoku Research Institute Inc., date of publication unknown.

Diaz–Gonzalez, Jose P.; Urban, Joseph E., "Language Aspects of Envisager: An Object Oriented Environment for the Specification of Real–time Systems," 1988, IEEE.

Kramer J. et al., "CONIC: an Integrated Approach to Distributed Computer Control Systems," IEE Proc., vol. 130 Pt. E, No. 1, Jan. 1983.

IEEE Industrial Electronics Society, 1997 IEEE International Workshop on Factory Communications Systems, WFCS '97 (Oct. 1, 1997).

http://www.longworks.echelon.com/News/Nixdorf.htlm, "Coupling of LonWorks and JAVA Applications" Nov. 5, 1998, pp. 1–10.

http://www.metra.com/MNSSpecs.html, "The OPEN LonWorks® Client/Server Solution", Metra Network Services, Nov. 5, 1998, pp. 1–9.

http://www.coative.com/pages/wp98energyman.html, Scalable, Integrated, Real–time Energy Management Requirements and System Architecture, Gaw, David and Koch, Ed. Coactive White Papers, Nov. 5, 1998, pp. 1–11.

http://www.coative.com/pages.wp9605lu.html, "A Technology Roadmap for Enterprise Connectivity to Control Networks" Byron, D. Gaw, D., Koch, E., Marsh, A., Schechter, A. Coactive White Papers, Nov. 5, 1998, pp. 1–13.

http://casal.upc.es/~ieee/looking/sempere/Remote.html, "Remote Access to an Industrial Network Map 3.0 Through Internet" Paya, S., Oltra, J., Gines, E. Communications Department Polytechnic University of Valencia, Nov. 5, 1998, pp. 1–8.

"Coative: Bringing the Other Network into Focus", VAR Business, 1998, n1413, p 53.

"Remote Monitoring via Integration of LonWorks and World Area Network Technology" Arnold, M. Dialog Web, pp. 1–13.

"Echelon Joins Java Alliance to Develop Open AOU Specifications for Industrial Automation" Business Wire, Oct. 7, 1996 pp. 1–2.

"Company President Interviewed About Connecting Networks with Smart Houses" VARbusiness, Jun. 22, 1998, p. 53.

Randazzo, M., Energy Users News, Mar., 1997, p. 1.

"Embedded Systems Conference Focuses on Getting The Job Done" Child, J., Electronic Design, Oct. 22, 1998, 55(1).

* cited by examiner

Niagara Class Hierarchy Overview

Station Communication

SYSTEM AND METHODS FOR OBJECT-ORIENTED CONTROL OF DIVERSE ELECTROMECHANICAL SYSTEMS USING A COMPUTER NETWORK

This application claims the benefit of a U.S. Provisional Application No. 60/085,539 filed May 15, 1998, the entire disclosure of which is incorporated herein by reference.

A portion of this disclosure contains material in which copyright is claimed by the applicant. The applicant has no objection to the copying of this material in the course of making copies of the application file or any patents that may issue on the application, but all other rights whatsoever in the copyrighted material are reserved.

FIELD OF THE INVENTION

The present invention relates generally to systems and methods for controlling and monitoring a variety of systems, using modular object-oriented control software which is operated in a local controller associated with the controlled system, and centrally controlled, monitored, and updated using a communications network such as the Internet. These systems and methods are particularly useful in Building Automation Systems (BAS) applications.

BACKGROUND OF THE INVENTION

In the past, control systems such as building automation systems have typically been proprietary single manufacturer solutions, or complex integrations of independent systems. There have been efforts in the industry to define standards so that such systems can be integrated more effectively, but no truly uniform approach has been made available.

The release of the BACnet/LonMark™ fieldbus communication standards for building automation systems have initiated a rethinking of building automation system architectures that is likely to revolutionize the control solution landscape. Traditional proprietary building automation architectures perform well, but they are expensive to design and install, cumbersome to reconfigure, and often require reams of software to integrate the stand-alone facility services. By contrast, in a distributed BACnet/LonMark fieldbus architecture, logic processing is encapsulated into autonomous multi-vendor modules that communicate among themselves through standard software to cooperatively solve a building control problem. However, in known building automation architectures, the external interface characteristics of devices that are added to the control system must be entered into the database representation of the device's external interface characteristics before the BAS can effectively control the new device.

Distributing control in this way is expected to minimize installation wiring, optimize control software, lower operating/maintenance costs, and simplify system expansion. In today's competitive global marketplace, users need the fieldbus's flexible, reusable and cost-effective building control solutions to respond quickly to changes in facility management services.

There have been advances in other areas of computing which have, however, not been applied in a satisfactory manner to the field of building automation systems. For example, computer systems standards have developed to simplify the cost and development requirements to program systems. Primary technologies include object-oriented software, the Java™ Virtual Machine (JVM) and Java-Beans™.

Object-oriented programming provides a new way to model real-world entities more directly as software building blocks that match the real world better than conventional programming mechanisms. This new software paradigm has an increasing impact on the software realm, in the same way the microprocessor has impacted hardware design and functionality.

In object-oriented programming, application programs are created from self-contained building block modules (objects). Rather than reinventing the wheel every time they create a new program, application engineers can borrow pre-written application modules from a library and simply plug them in. By using object libraries, developers can concentrate on linking appropriate objects together and writing any custom objects that their applications require. Custom objects, in turn, can be added to the library for future reuse.

Networking standards have also developed in an effort to simplify the cost and development requirements to integrate systems. Primary technologies developed in the building automation industry include American Society of Heating Refrigeration and Air Conditioning Engineers (ASHRAE) Building and Control Network (BACnet™), and the ECHELON LONTALK™ protocol (developed by Echelon Corporation of Palo Alto, Calif.).

Meanwhile, in the computer industry, there have been efforts to develop communications standards, although again, these standards have not been applied in any truly effective way to the specific problems of building automation. For example, the goal of the Internet/WWW/Java/CORBA standards is to provide the information the user wants, without taking into account what kind of program to use, what computer it runs on, or the format of the information.

Through a system of hypertext, users of the Web have been able to select and view information from all over the world. However, the basic Web lacks true interactivity—real-time, dynamic, and visual interaction between the user and application. Java brings this missing interactivity to the Web. With a Java-enabled Web browser, the user can encounter animation and interactive applications.

Efforts to implement real time control systems over the Internet have generally been unsuccessful, because of variability in packet transit times and the lack of guaranteed delivery over the Internet.

In conclusion, control systems have historically been based primarily on proprietary technologies of a single manufacturer. Although there have been efforts to standardize these architectures, they have achieved only limited success. The inventors believe that there is a need for a highly integrated standard in the field of control systems which integrates a Java-based common object model, specially adapted for use in building automation applications, and provides central control and monitoring using communications network standards such as the internet

SUMMARY OF THE INVENTION

Therefore, it is a general object of the present invention to provide a control system and methods using object-oriented software that integrates BACnet, LonMark, CORBA, Java and Internet systems into a common object model. The present invention in a preferred embodiment uses object technology as a key to constructing truly distributed applications in a multi-vendor open system environment supporting multiple industry standards. The BACnet/LonMark/Internet/CORBA architectures are combined in the invention and Java object-oriented software concepts are applied to effectuate distributed control and information management. Messages (events) are passed between the autonomous modules that use object-technology to encapsulate both data and functionality. These functional objects are replicated for reuse, and are grouped to form more complex functions that build on the work of other objects. The Web BAS Server's navigational tools provide a global view of the process that is being controlled by the autonomous fieldbus modules and provide unrestricted information flow.

It is a further general object of the present invention to provide a control system and methods in which both pre-defined objects and user-defined and created objects exist in a single control system. A customized programming language is provided for object modification, creation, and management. A set of pre-defined objects is also provided.

It is a still further general object of the present invention to provide a control system and methods that maintains the integrity of system data in a distributed system, and that distributes system data as required throughout the distributed system, through the use of archiving and synchronization techniques. A master copy of each datum is preferably maintained at a single virtual machine, and a system of synchronized and nonsynchronized caches is used to ensure that objects of the control system have access to current system data. System data is archived in order to provide persistency.

It is a still further object of the present invention to provide a control system and methods in which object properties associated with a device are updated dynamically to reflect external interface characteristics of the device. To accomplish this, devices of the control system are queried for their external interface characteristics and their associated object properties updated accordingly. This provides for management of devices without requiring a pre-programed specific external interface representation.

These as well as other objects of the present invention are apparent upon inspection of this specification including the appendices and drawings.

DETAILED DESCRIPTION OF THE PREFERRED EMBODIMENTS

Figure 1:
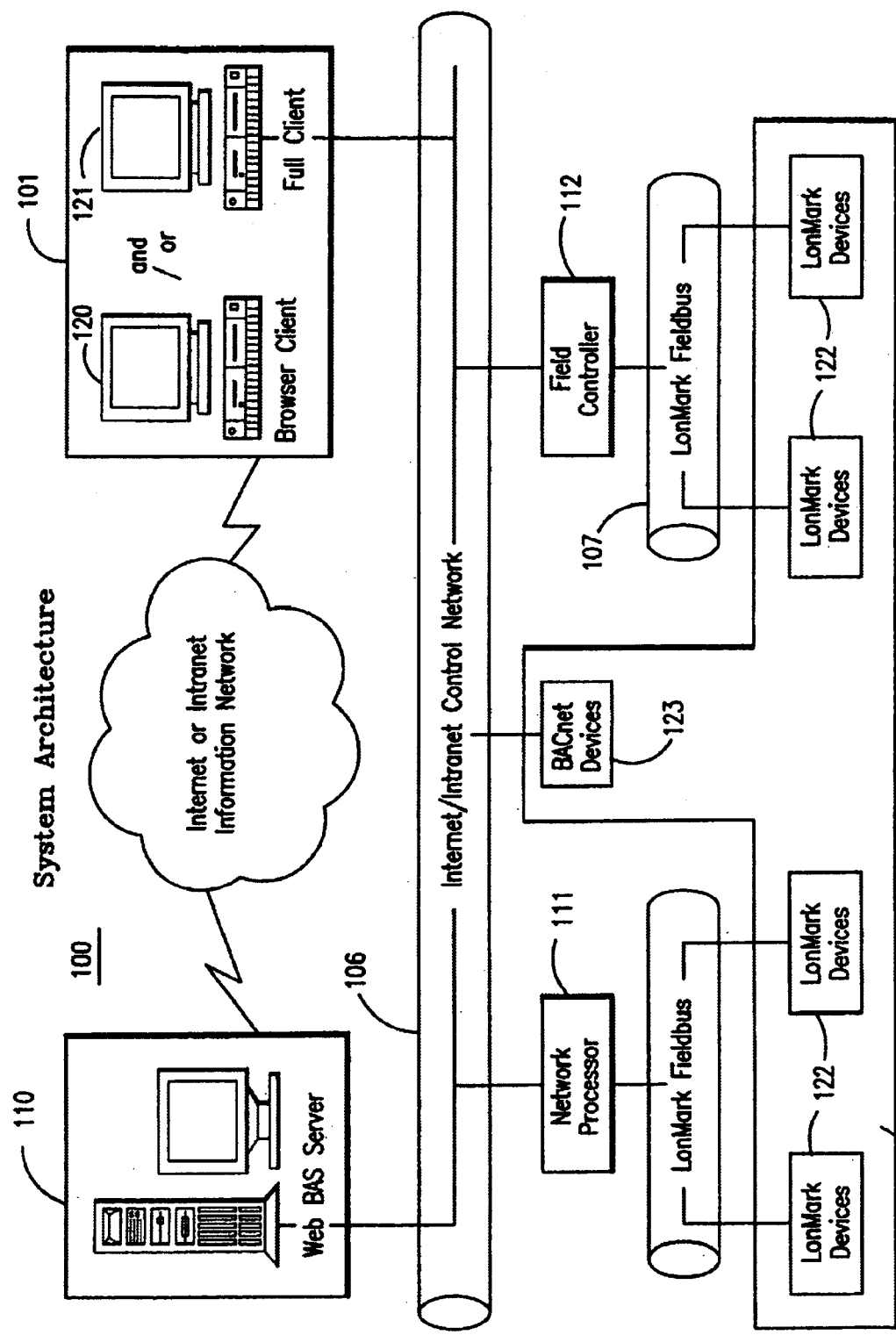
FIG. 1 is a preferred general architecture of an object-oriented control system comprising Clients, Stations, Foreign Devices and Remote Hosts.
Figure 1A:
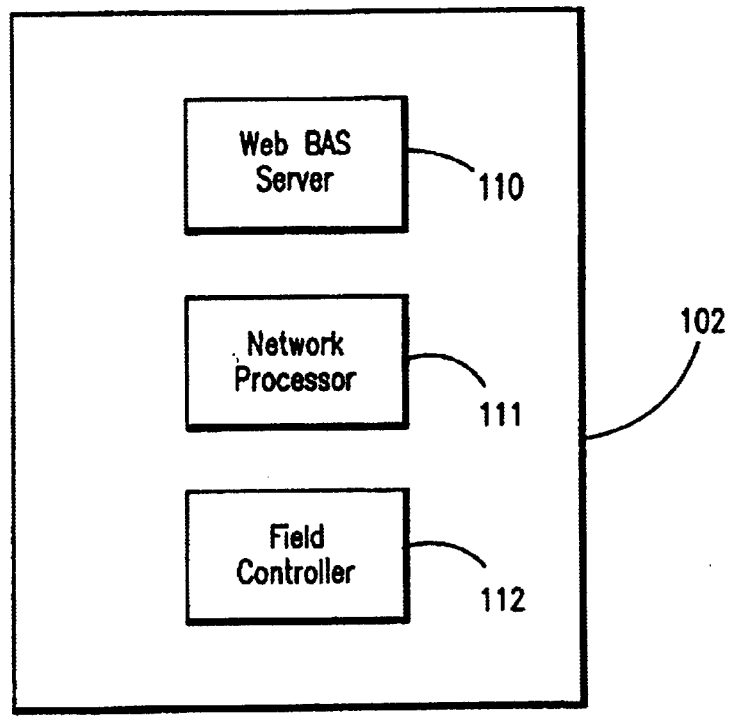
FIG. 1A illustrates different types of stations of the object-oriented control system.

A presently preferred embodiment of an object-oriented control system 100 provides solutions for distributed control of systems of various sizes and configurations. Preferably, a general architecture is provided comprising Clients 101, Stations 102 (reference FIG. 1A), and Foreign Devices 105 as shown in FIG. 1.

Clients 101 in the present system include a Browser Client 120 and a Full Client 121. Clients 101 provide access to the system via an Intranet or the Internet. Clients 101 rely on the server software in a station to provide this access. Browser client 120 provides full user access to the system from any approved Java Enabled Browser. Full Client 121 provides all of the capability of Browser Client 120, plus an Application Enabler Tool. A user of object-oriented control system 100 interacts with Browser Client 120 as described in the Browser User's Guide contained in Appendix V attached hereto.

Stations 102 are the heart of object-oriented control system 100. Stations 102 include a Web BAS Server (WBS) (110), Network Processor (NP) (111) and Field Controller (FC) (112). Stations 102 typically perform one or more of three roles.

1. Stations 102 integrate Foreign Devices 108 into the system. WBS 110, NP 111 and FC 112 can perform this role.

2. Stations 102 supervise other stations 102. In this role, stations 102 integrate the stations 102 they supervise into the system. Supervising also includes requirements such as monitoring and routing. WBS 110 and NP 111 can perform this role.

3. Stations 102 can be the master of the local system. In this role they provide persistent backup of all configuration information. WBS 110 and FC 112 can perform this role.

In the role of integrator, station 102 brings information into objects so that it is available to the rest of the system with predictable behavior. In its supervisory role, station 102 monitors other stations 102, including checking system integrity between stations and routing data and event information.

When functioning as a master, station 102 is defined as the primary master of the system. The primary master provides backups of all configuration information.

Foreign Devices 105 include any devices compatible with the system, but which are not controlled directly using downloadable Java-based objects. Two specified types of foreign devices 105 are BACnet™ Devices 123 and LonMark™ Devices 122 which adhere to the standards promulgated in the industry for those devices. Remote Hosts 108 provide some functions of the system at a site other than the site of the control system. Remote Hosts 108 can be linked to the job by any communications link supporting TCP/IP, including serial modems.

Figure 9:
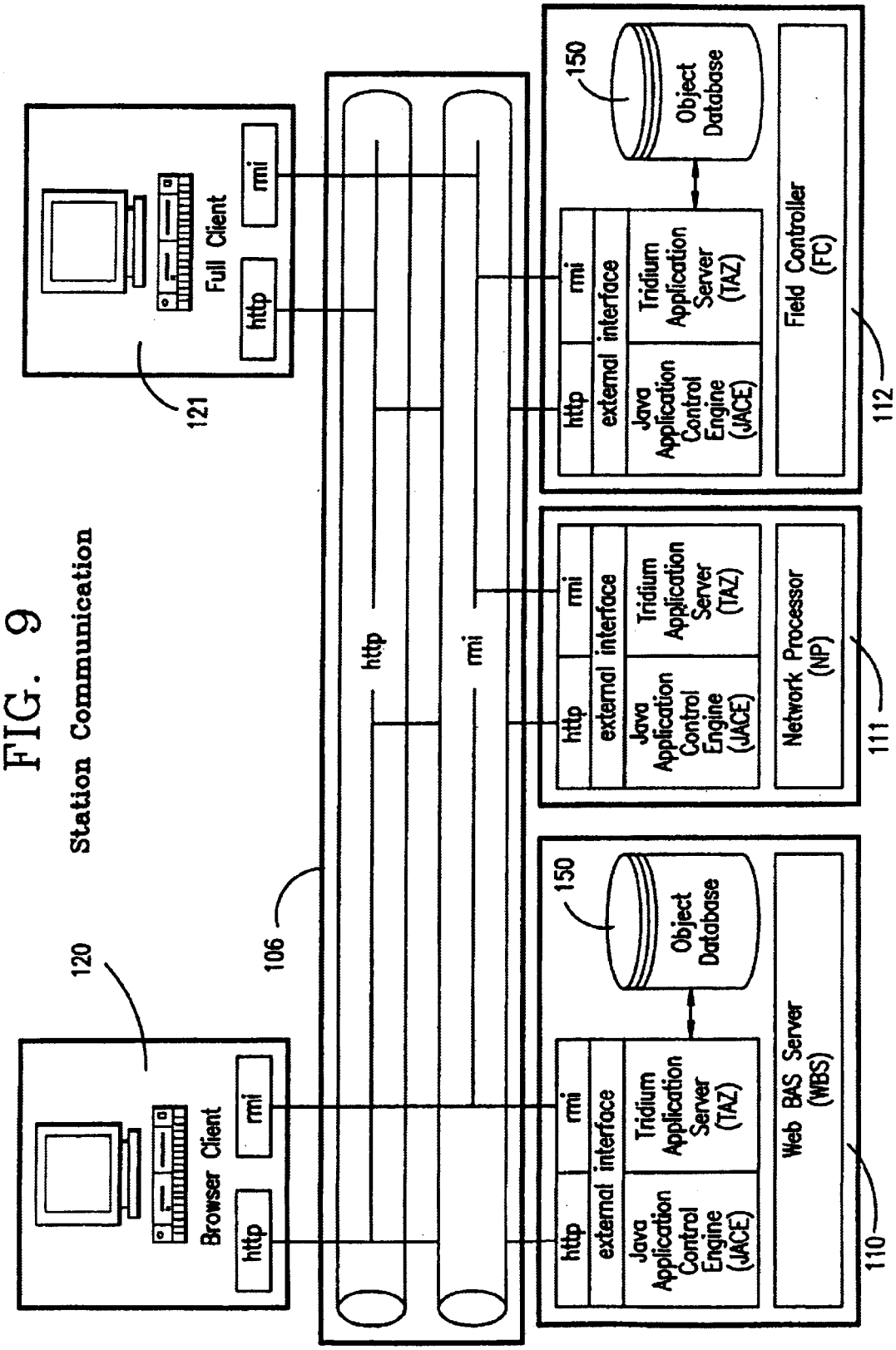
FIG. 9 describes communication between stations and clients of a preferred embodiment of an object-oriented control system.
Figure 10:
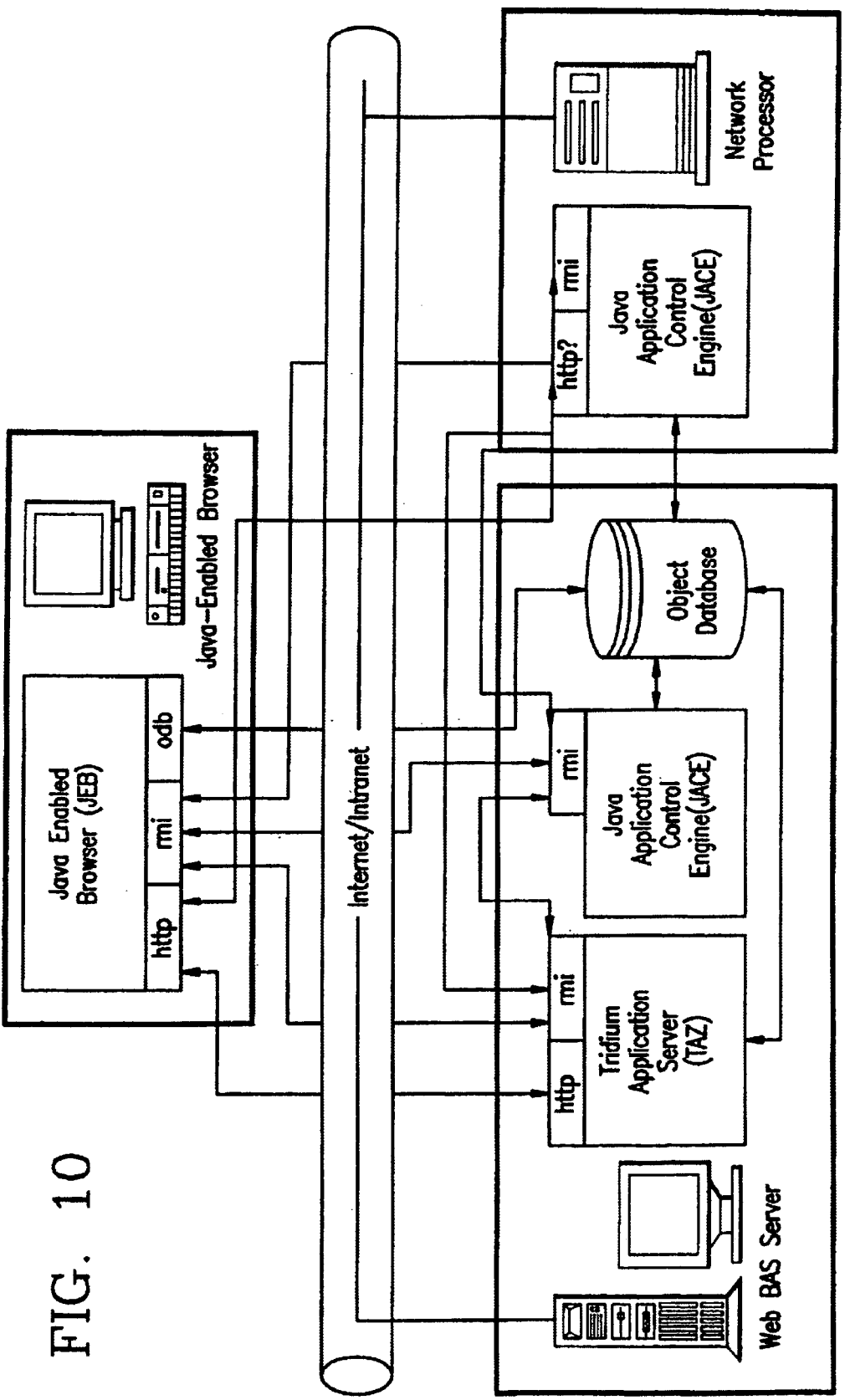
FIG. 10 further describes communication between stations and clients of a preferred embodiment of an object-oriented control system.

Stations 102 communicate as described in FIGS. 9 and 10. Browser clients 120 and full clients 121 communicate with stations 102, including Web BAS server 110, network processor 111, and field controller 112, via control network 106 using Hypertext Transport,Protocol (HTTP) and Java Remote Method Invocation (RMI). Web BAS server 110 and field controller 112 further comprise an object database 150 for storage of and access to objects of object-oriented control system 100.

Figure 11:
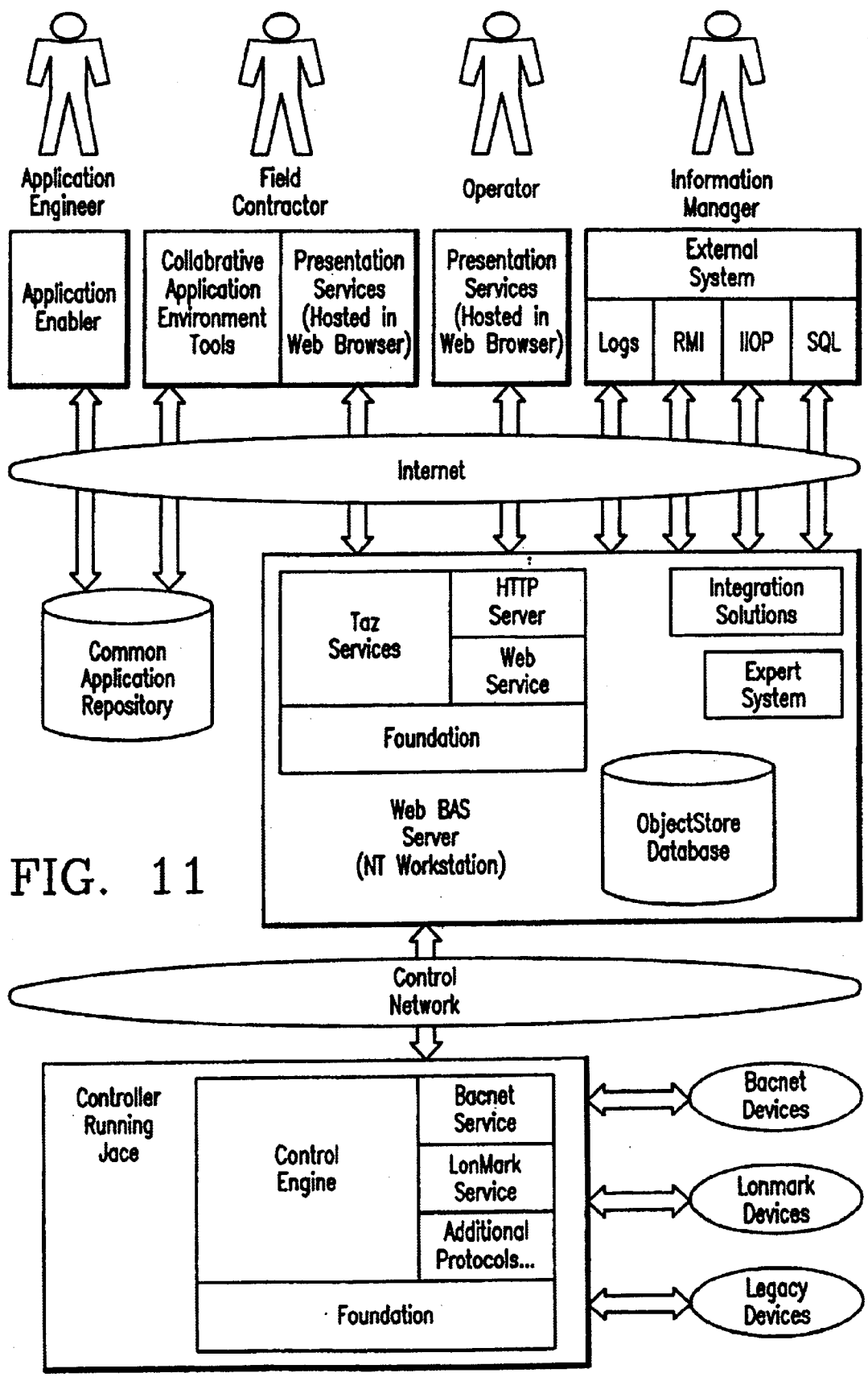
FIG. 11 describes the architecture of a preferred embodiment of an object-oriented control system.

A preferred architecture of object-oriented control system 100 is described in FIG. 11 for a variety of users. This architecture is further described in Appendix D.

To permit distributed control system management of LonMark™ Devices 122, it is necessary for the external interface for the particular device type to be represented in the object properties associated with each LonMark™ Device 122. The external interface information may include, for example, network variables available for the particular device type. In the past, for each new LorMark™ Device 122 added to the system or for changes to the external interface of a LonMark™ Device 122, it has been required for the user of a distributed control system to first program or enter this external interface information into the object properties associated with LonMark™ Device 122 in order for a distributed control system to manage LonMark™ Device 122, resulting in delays in bringing a new or modified foreign device 105 online and able to be controlled by a distributed control system. Object-oriented control system 100 overcomes this limitation by providing dynamic Lon-Mark™ device update of the object properties associated with a LonMark™ Devices 122 to reflect external interface characteristics of the device. To accomplish this, object-oriented control system 100 queries LonMark™ Devices 122 for their external interface characteristics. The effected object properties associated with the queried LonMark™ Devices 122 are then updated and configured according to the information received in response to the query. This dynamic device external interface update capability thus provides for management of LonMark™ Devices 122 without requiring prior pre-programmed specific external interface representation by the user, thereby saving time and reducing the likelihood of error in configuring the Lon-Mark™ Device 122 object properties.

The Network Processor 111 and Field Controller 112 types of stations 102 preferably implement Java Virtual Machines (JVM) which can be programmed using Java objects for specific control of a system attached to NP 111 or FC 112. The programming of these JVMs can be adjusted in real time by adding, deleting, or reconfiguring links between objects. Each object is preferably implemented using Java and corresponds to a specific control function, and may be linked to other objects using a set of predetermined links. For example, the available objects may include function generators, analog and digital inputs and outputs, multistate outputs, alarm objects, available station service objects, and custom user-programmed objects. Each of these objects may be combined in any desired manner to produce a virtual programmed controller for the device or devices connected to the relevant JVM.

In a presently preferred embodiment, pre-defined objects coexist with user-defined objects in a single object-oriented control system 100. To facilitate object creation, a customized programming language is preferably provided, based on the Java language, but both customized and simplified for control applications. The Tripl™ programming language described in Appendix V is a preferred implementation of this language. The customized programming language is used in specifying programming instructions for program nodes of object-oriented control system 100. Further, a programming editor is provided as a development tool for user programming of program nodes using the customized programming language.

Throughout this specification and the appendices attached hereto, the term "node" is used to refer to certain objects and their properties provided by object-oriented control system 100. It is to be understood that in the context of a presently preferred embodiment of object-oriented control system 100 a "node" is an object. Appendix V provides further description of nodes in the context of the present invention. The processing and functional behavior of a node is determined by its associated properties, which are programmable. Most of the software applications comprising object-oriented control system 100 are provided in the form of nodes.

A set of object properties provided by object-oriented control system 100 is specified in Appendix X attached hereto.

A set of pre-defined objects provided by object-oriented control system 100 is specified in Appendix Y attached hereto.

Further, object-oriented control system 100 provides calendars, schedules, and logs by which a user may control commands and the timing and operation of software applications of the system. Calendars allow the specification of days that should be treated specially with respect to system operation. Schedules allow program commands to be performed at specific times. Logs are a set of nodes and services that collect system information into buffers for sharing of information throughout object-oriented control system 100. Further description of the use of calendars, schedules, and logs, including use of calendars, schedules, and logs via web-browser, is specified in Appendix V attached hereto.

Logs are stored persistently in a database that supports intelligent archiving of information. Specific types of logs include, but are not limited to:

1. Control logs for collecting and storing numeric status values and output string values. Control logs execute in the control engine to collect information output from other nodes.

2. Service logs for logging errors and operator-made changes. Service logs occur once per station 102.

3. Foreign logs containing log information obtained from systems external to object-oriented control system 100.

In addition, the LogService software application provides web-based access via HyperText Transport Protocol (HTTP) to all logs.

Access to objects, or nodes, is preferably controlled through a multilevel security protocol (preferably an 8-level protocol), and the objects may be grouped in "containers" which facilitate display at various levels of detail. That is, a person monitoring, controlling, or programming the object operation may display the linked objects at various levels of detail depending on immediate requirements. Several features are provided to control who has access to object-oriented control system 100 and who can access and modify individual objects including, but not limited to, an initial password required at logon and programmable security groups per object. These as well as other capabilities of the security protocol are further described in Appendix V attached hereto.

More specifically, the security model requires any user to logon to the system with valid password. Each user object can be assigned or denied permissions to any of 8 access levels (Security Permissions) of the 8 security groups. These security groups are independent from each other and their meaning is a local matter. Each object can be assigned to any combination of these 8 security groups also. In this way many different access definitions can be defined simultaneously.

Each user object defined in the database has a user name and password that are required in order to logon to the system. Each of these user objects can be granted or denied permissions to any of the Security Permissions in each of the 8 Security Groups. There are 8 Security Groups defined for the system. They are independent of each other and their meaning is a local matter. Each object can be assigned to any combination of these 8 security groups through the property security groups. By default, each object is assigned to Security Group 0 (general). In this way many different Security Permissions can be defined simultaneously. The default Security Groups are as follows:

0=general
1=hvac
2=security
3=life safety
4=group4
5=group5
6=group6
7=group7

Security permissions are basic rights granted to individual users. They include without limitation: Operator Read, Operator Write, Administrator Read, Administrator Write, Standard Commands, Acknowledge Alarm, Emergency Commands, and Administrator Commands.

A user's access rights to an object are determined by combining his rights for each group that is checked or indicated in the object's security groups property. In addition, if a user has rights to a container, some rights get applied to its children. If a user has Operator Read permissions to a container, that user can see the children in the workspace view. If a user has Administrator Write permissions to a container, that user can perform numerous functions to the container including linking, cut, copy, duplicate, delete and rename.

Object security is determined by the combination of Security Groups that a user assigns to the object and the designation of each of its properties as an Operator or Administrator property. The user may assign any object to any combination of the 8 Security Groups defined for the system. This is done through the property security groups. By default, each object is assigned to Security Group 0 (general).

Each property in the system has been designated as either an Operator or Administrator property. This determines which Security Permissions a user must have in order to view or edit the property of an object.

Operator Security Permissions are defined to be the functions required as a system operator who may need to view or edit only the lowest level features of objects.

Administrator Security Permissions are defined to be the functions required to configure a system. This person may need to view or edit all the features of the system. Administrator Edit includes creating objects and linking objects in addition to editing properties.

Object-oriented control system 100 provides a user service to define new users through user objects. The user service ensures that user security groups and permissions are enforced for each user. New user objects are created for new users containing a default username and password. The user may change his password. Users or objects may be assigned to one or more security groups. An individual user's security permissions may be changed.

Objects may be linked together dynamically using one of the following links, without limitation: Normal, Trigger, LonTalkLocal, LonTalkNetwork, UI, Composite, or External. Instructions for creating and using links are contained in Appendix V attached hereto.

Further, object-oriented control system 100 uses BACnet™ command prioritization to arbitrate actions performed by software application programs upon objects or nodes. BACnet™ command prioritization is accomplished by assigning different priority levels to application programs capable of commanding a particular object or node, and storing the particular prioritization for that node at that node as an object property of the node. Each node, or object, acts upon commands received from software application programs according to its command prioritization levels. Further description of command prioritization is provided in Appendix V attached hereto.

Clients 101, servers 110, and network processors 111 are preferably implemented using personal computers, such as Intel Pentium™ based personal computers, running the Microsoft Windows 95 or Windows NT operating systems. These computers preferably run software such as that disclosed in Appendix W, which provides source code listings for the operating software of these devices. Field Controllers 112 may be implemented using limited capability, low cost single board computers capable of operating as Java Virtual Machines. For example, so-called Network Computers may be used for this purpose.

Figure 2:
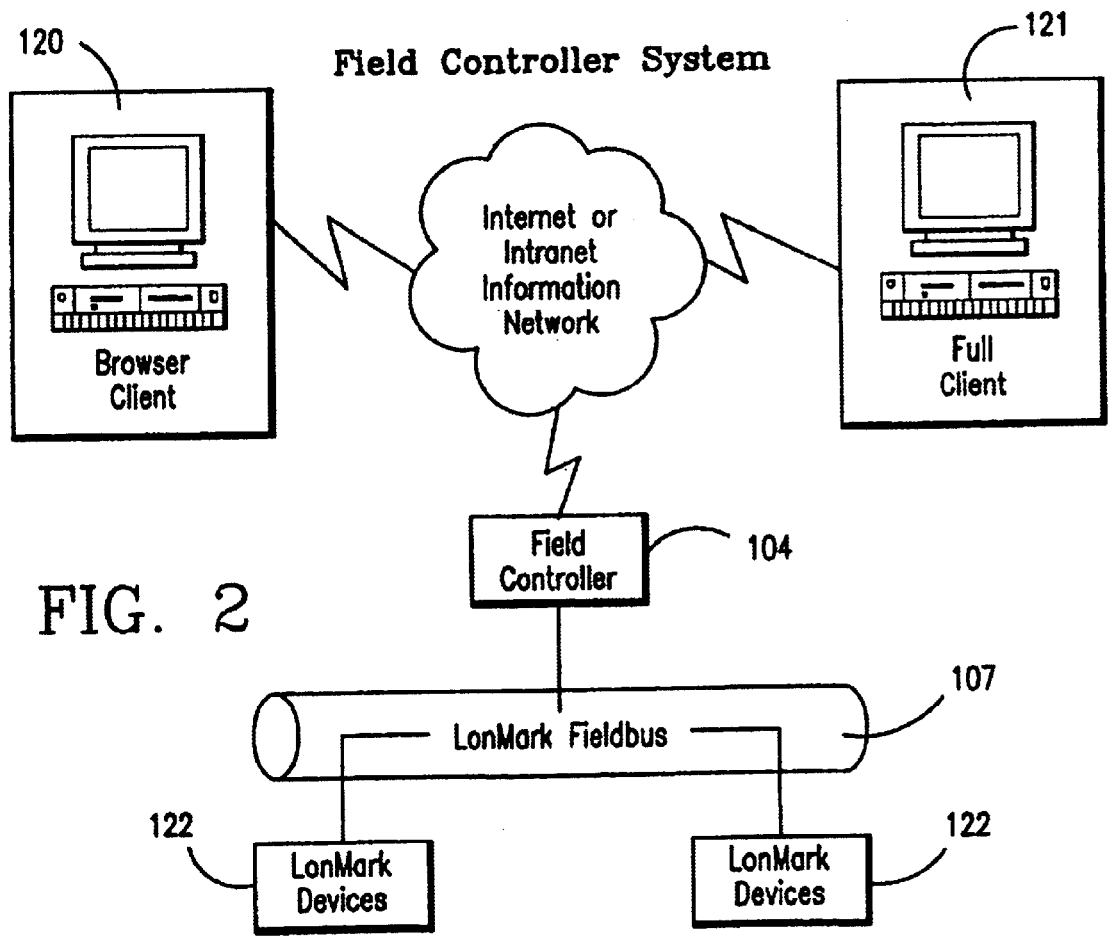
FIG. 2 shows an alternative embodiment of a configuration of the object-oriented control system in the form of a Field Controller System in which clients access a single Field Controller supervising a LonMark™ Fieldbus.
Figure 5:
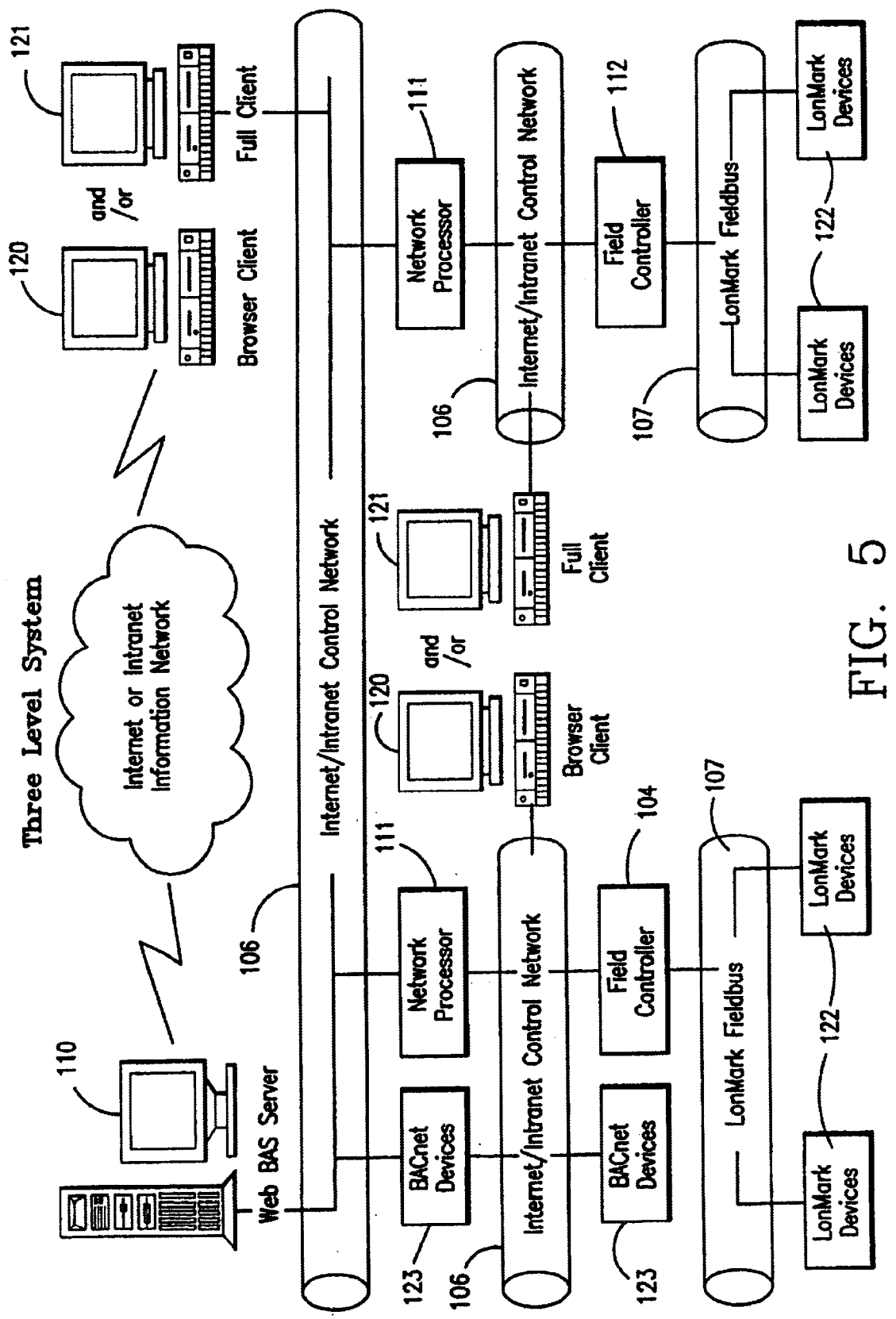
FIG. 5 shows an alternative embodiment of a configuration of the object-oriented control system in the form of a Three Level System may also be provided in which a Web BAS Server directly supervises Network Processors which in turn supervise Field Controllers.
Figure 6:
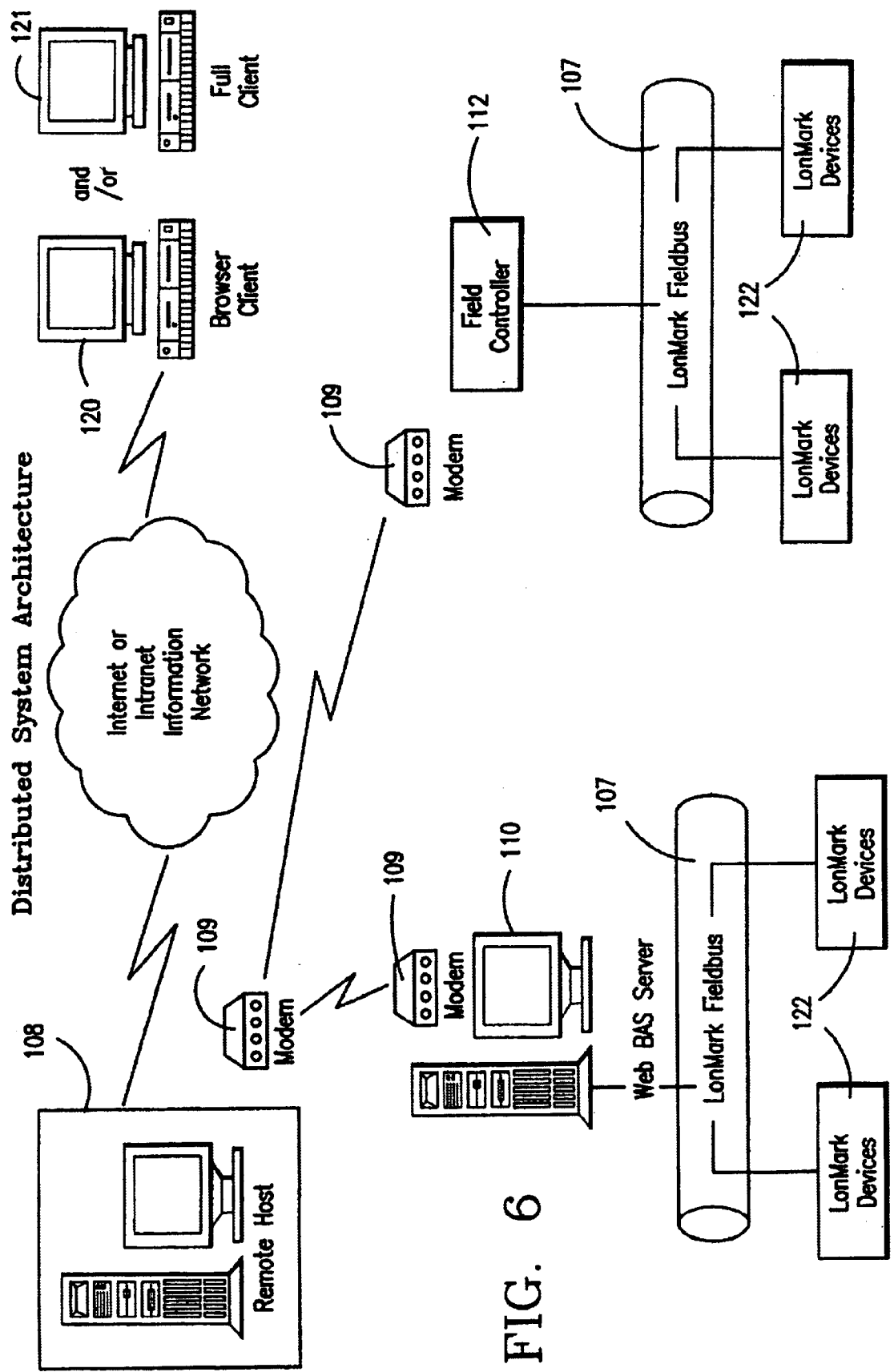
FIG. 6 shows an alternative embodiment of a configuration of the object-oriented control system in the form of a Distributed System in which a collection of large or small systems is connected and supervised via a Remote Host.

The architecture of the present invention supports many different system configurations. Some of the more common configurations include a Field Controller System (FIG. 2), Small Web BAS Server System (FIG. 3), Two Level System (FIG. 4), Three Level System (FIG. 5), and a Distributed System (FIG. 6). Referring to FIG. 2, the Field Controller System is a configuration of the present invention in which clients access a single Field Controller 112 supervising a LonMark Fieldbus 107 connected to a plurality of LonMark Devices 122.

Figure 3:
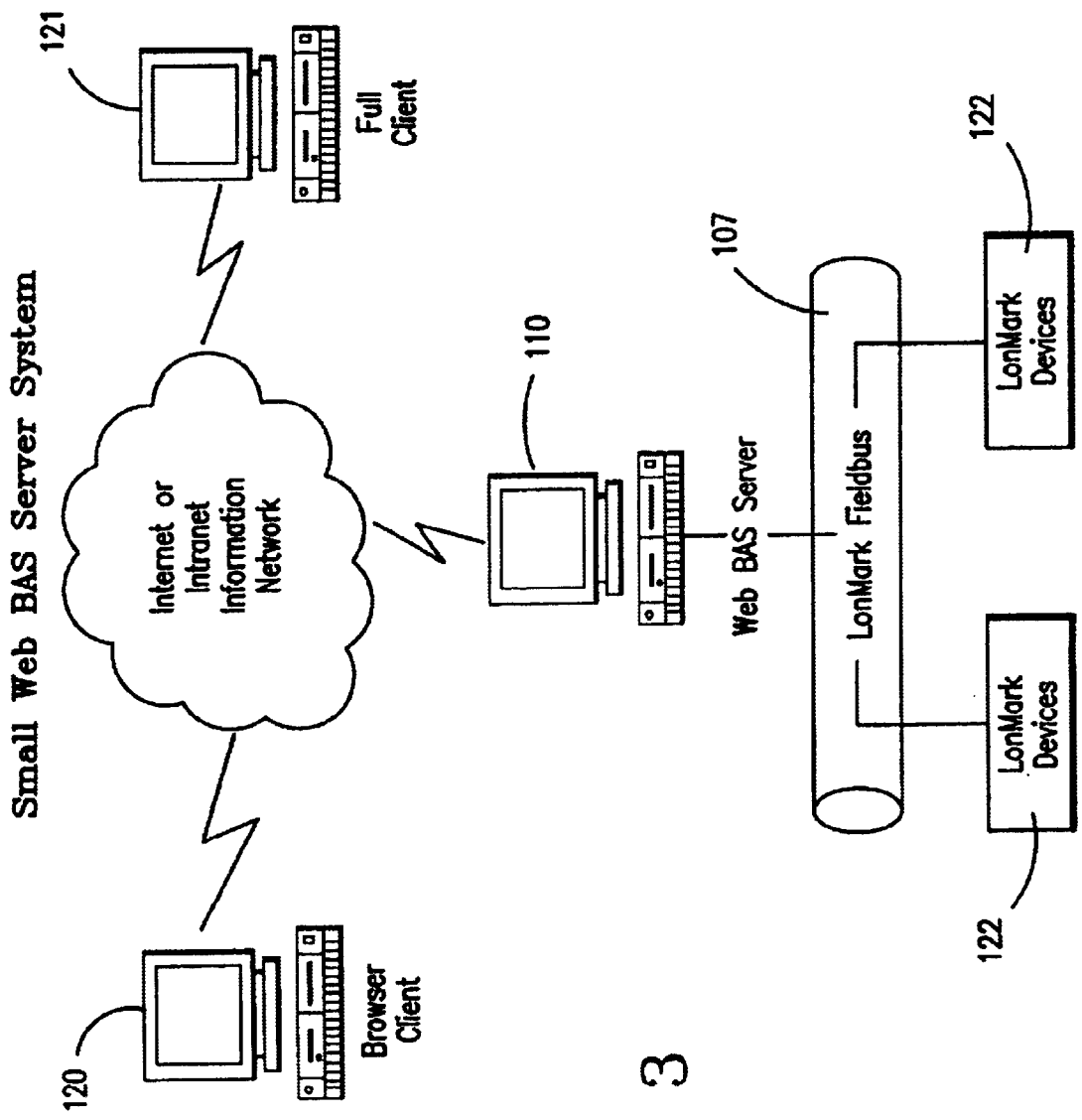
FIG. 3 shows an alternative embodiment of a configuration of the object-oriented control system in the form of a Small Web BAS Server System where clients access a single Web BAS Server supervising a LonMark™ Fieldbus.
Figure 4:
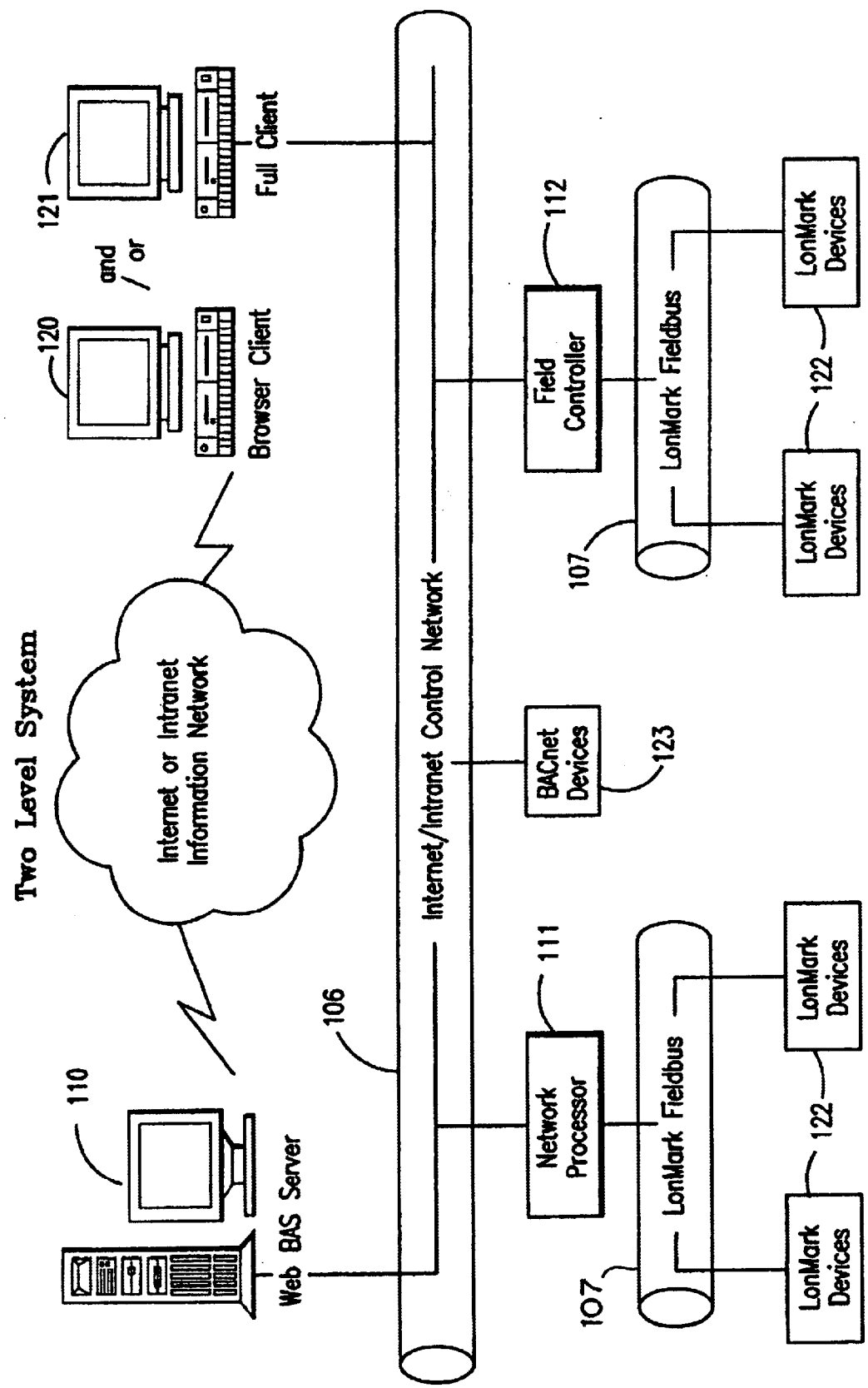
FIG. 4 shows a preferred embodiment of a configuration of the object-oriented control system in the form of a Two Level System in which the Web BAS Server directly supervises a combination of Network Processors, Field Controllers and BACnet Devices.

FIG. 3 shows a Small Web BAS Server System where clients 101 (either browser client 120 or full client 121, or both) access a single Web BAS Server 110 supervising a LonMark Fieldbus 107 connected to a plurality of LonMark Devices 122. The Two Level System, as shown in FIG. 4, is a system configured with Web BAS Server 110 directly supervising any combination of Network Processors 111, Field Controllers 112 and BACnet Devices 123. As shown in FIG. 5, a Three Level System may also be provided in which Web BAS Server 110 directly supervises Network Processors 111 which in turn supervise Field Controllers 112. Finally, FIG. 6 shows an alternative embodiment of an object-oriented control system 100 configured as a Distributed System further comprising a Remote Host 108 and in which a collection of large or small systems is connected and supervised via Remote Host 108 using modems 109.

These configurations are further discussed in Appendix I, which is a general specification for a presently preferred embodiment of object-oriented control system 100. Further preferred application configurations are shown in Appendices B, C, E, H and K.

The system encompasses an architecture for constructing, deploying, and running a system which automates the many services required to successfully operate and manage office, commercial, healthcare, educational, and industrial facilities. This architecture is discussed in more detail in Appendix D, Niagara™ Software Architecture.

Figure 7:
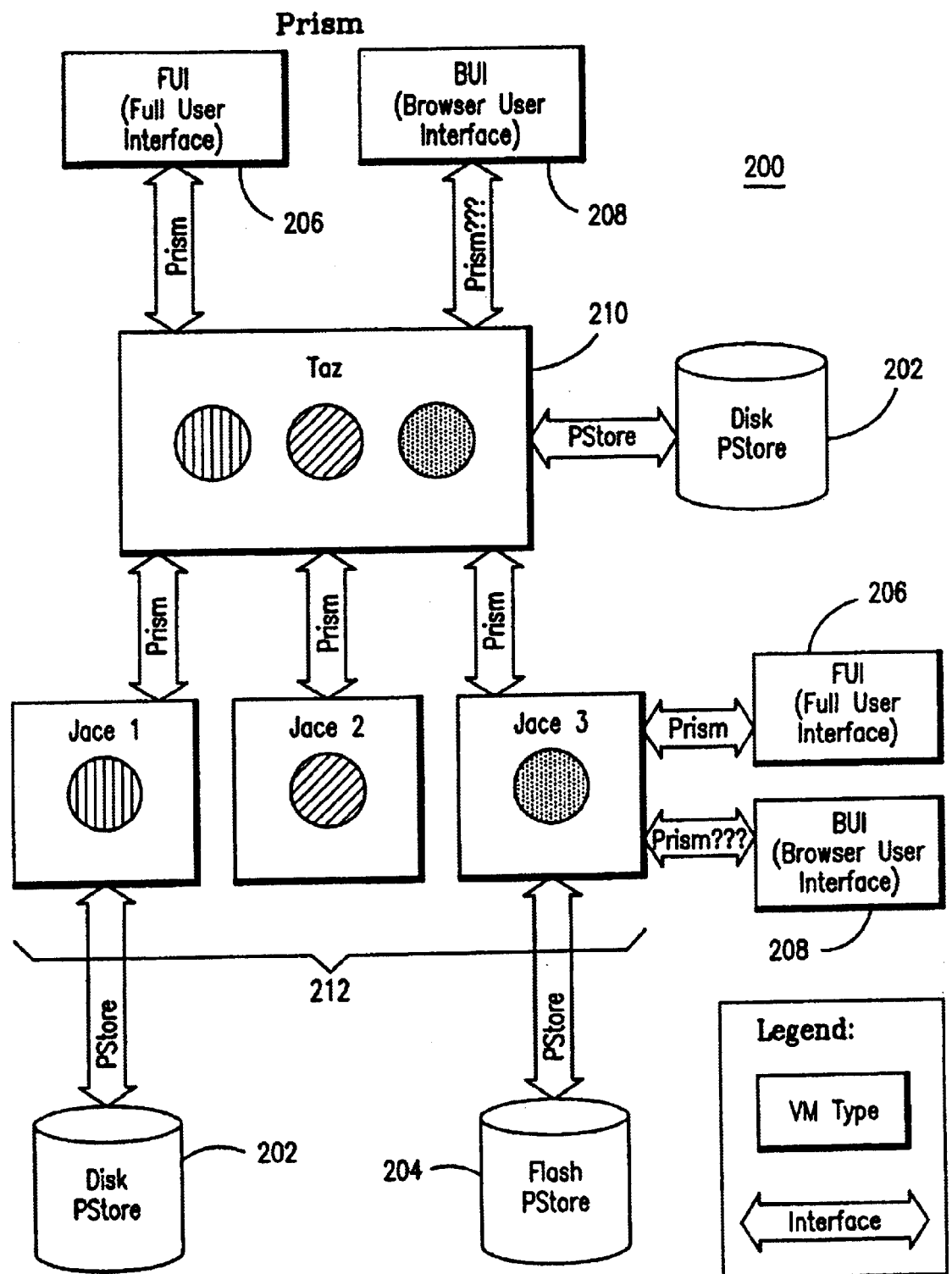
FIG. 7 is a description of a preferred embodiment of a persistent and real-time information synchronization manager for an object-oriented control system.

Data flow in the system is preferably governed by a persistent and real-time information synchronization manager (PRISM) 200 at each station 102 that is key to achieving the objectives of distributed object-oriented control system 100. This feature of the invention is discussed further in Appendix F (Prism™ Requirements and Design) and Appendix J (Prism™ Design). PRISM 200 maintains the integrity of system data throughout object-oriented control system 100 through the use of archiving and synchronization techniques as described in FIG. 7. Data associated with object-oriented control system 100 is categorized into system data, Java Application and Control Engines (JACEs), nodes, and properties as described in Appendix F. Further, each datum in object-oriented control system 100 is also categorized according to its life-cycle. Transient data exists only during the lifetime of its host virtual machine (VM). Persistent data exists beyond the life of its host VM and persists through power failure or shutdown. Virtual machines present in object-oriented control system 100 include, but are not limited to, a full user interface 206 associated with full client 121, a browser user interface 208 associated with browser client 120, a Taz 210, and one or more JACEs 212. Persistent data is archived by saving it in non-volatile storage. In a presently preferred embodiment, FLASH 204 and magnetic disk 202 non-volatile storage media (i.e., "Pstore") are used to store archived persistent data. JACEs 212 maintain a master copy of their associated transient and persistent data. Synchronized and non-synchronized caches are used under the control of PRISM 200 to ensure that objects have access to current system data. Each virtual machine has at least one cache containing all data needed by that virtual machine. Caches are maintained current by a method of reconciliation as described in Appendix J in which the caches of virtual machines are reconciled with, or used to update, the caches of their supervising stations 102. Stations 102 then reconcile their caches with each other. In a presently preferred embodiment, a checksum is used to determine inconsistencies in current data. Each supervising stations 102 obtains the current virtual machine cached data for the nodes stored at a supervising station, and then computes a checksum over its cache contents and the cache data received from the queried virtual machines. If the checksums do not match, then an inconsistency is detected, in which case the supervising station 102 takes steps to correct the problem, including, but not limited to, update its cache to reflect the newer data, perform timestamp comparison to select the newer data, or raise an alarm or error indication.

In a presently most preferred embodiment, instead of a single Web BAS server 110, object-oriented control system 100 comprises a plurality of Web BAS servers 110, each of a plurality of Web BAS servers 110 having its own database of persistent data. In this presently most preferred embodiment, objects access persistent data without regard to the physical location of the particular Web BAS server 110 where the data is archived. A station 102 can communicate with other stations 102 without regard to whether the other station 102 is also connected to its local Web BAS server 110.

As noted previously, to support a wide range of requirements for objects in all type of facilities, the preferred embodiment of the invention provides a Java Modular Environment which allows software modules to "plug-in" anywhere in the control system. In this way the objects can be placed where they are needed and provide the best real-time performance.

Figure 8:
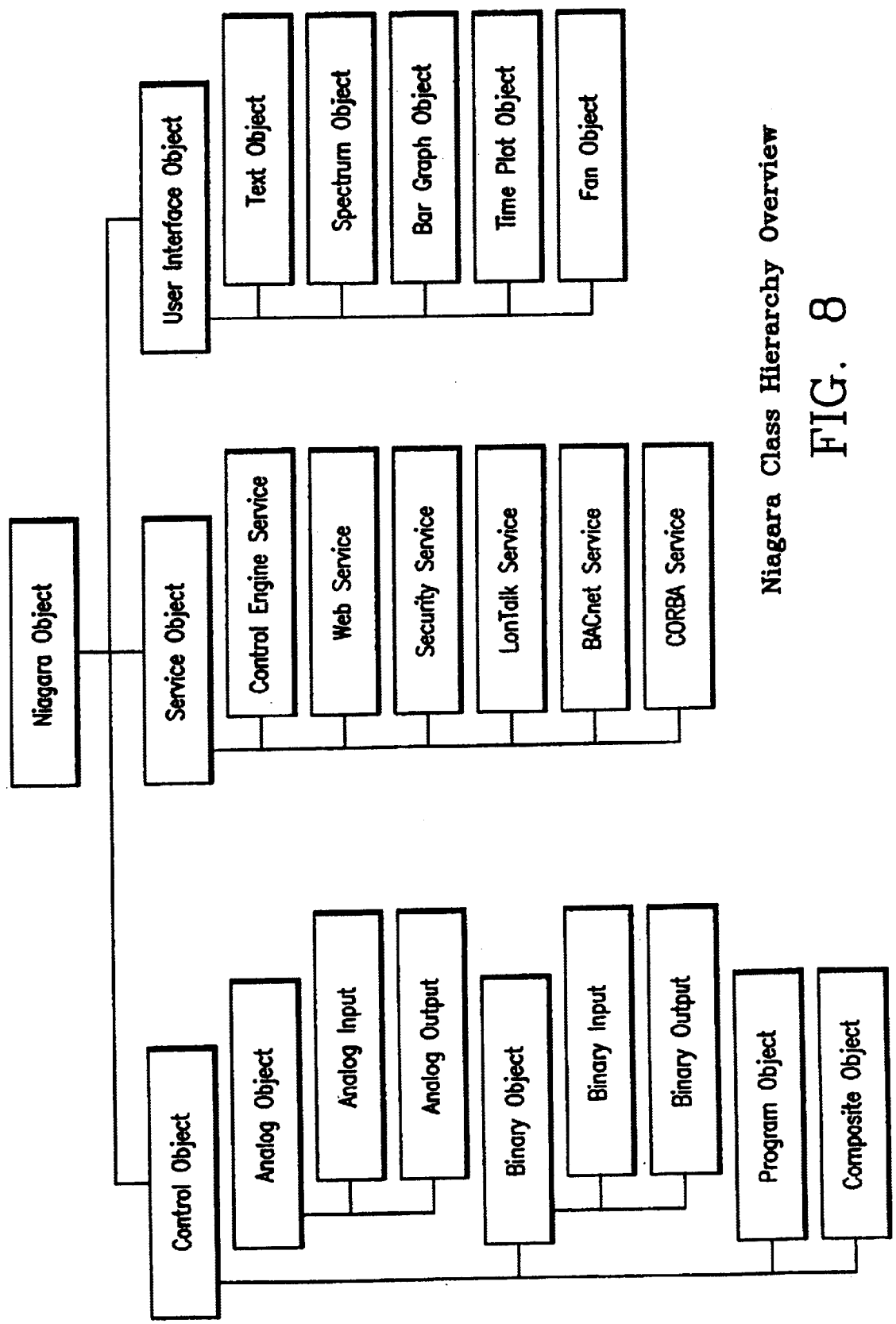
FIG. 8 is an overview of an object class hierarchy of an object-oriented control system.

The system is preferably composed of Java class files to implement the system in a platform independent way so that it can be delivered in any supported platform. The Core Class Hierarchy according to the present invention provides a system with Nodes and Platforms that enable this flexibility. The features of this hierarchy are described further in Appendix G, Niagara™ Core Class Hierarchy. The hierarchy is supported by a flexible approach to configuring drivers for the different interfaces and protocols for the different platforms. In addition to the Core Class Hierarchy, user objects are organized in a hierarchy so that they inherit behavior hierarchically and perform predictably. The hierarchy established in a preferred embodiment is shown in FIG. 8.

In a presently preferred embodiment, a user of object-oriented control system 100 can create and manipulate objects associated with a plurality of object categories including, but not limited to, the following object categories: Control, Applications, User Interface, Containers, LonWorks™, BACnet, Admin, and Services.

Further, the Control object category further comprises the following sub-categories: Analog Input, Analog Output, Binary Input, Binary Output, Comparison, Logic, Loop, Math, Function Generator, and Totalizer.

Further, the Applications object category further comprises the following sub-categories: Schedule, Calendar, Program, Analog Log, Binary Log, and Integer Log.

Further, the User Interface object category further comprises the following sub-categories: Bar Graph, Boolean Image, Bound Image, Damper, Fan, Hot Spot, Image Spectrum, Text, and Time Plot.

Further, the Containers object category further comprises the Composite and Generic sub-categories.

Further, the LonWorks™ object category further comprises the following sub-categories: Snvt Switch Mux, Snvt Switch Demux, DemoFcu, Leviton Switch, Leviton Sw 481, Action Instr AO, Action Instr AI, Action Instr DO, and Local Lon Node.

Further, the BACnet object category further comprises the following sub-categories: Device, AnalogInput, AnalogOutput, BinaryInput, and BinaryOutput.

Further, the Services object category further comprises the following sub-categories: Control Engine, UI Engine, User Access, Interstation Link, HTTPD Service, Web Text, Web View, Media, Program Debug, Dial Up, Lonworks, Lon Communications, Network Variable Poll Scheduler, Network Variable Manager, BACnet Server, BACnet Client, BACnet Poll, BACnet Transport, BACnet Network, BACnet Ethernet, Error Archive, Error Forward, and Mail.

Further, the Admin object category further comprises the User sub-category.

The purposes and uses of these objects provided by object-oriented control system 100 include, but are not limited to, those commonly understood to be associated with each of these object categories and sub-categories.

To perform acceptably in real-time environments, the control engine for objects must perform predictably and yet provide the user with control over order of execution of objects. The present invention provides this capability in a manner which is disclosed in more detail in Appendix M, Control Engine Design. In a presently preferred embodiment, object properties are provided to specify execution frequency and order of execution. In a presently most preferred embodiment, five different execution frequencies may be specified. Each execution frequency may be adjusted by editing the associated object property in multiples of 100 milliseconds. In a presently most preferred embodiment, three different execution orders may be specified.

In order to provide information about a site's performance to a remote site, the system provides a programmable mail service to send email to remote sites with real-time information whenever programmed to do so. A preferred implementation of this feature is further discussed in Appendix N, MailService Developer Notes, and disclosed in detail in Appendix W, Source Code Listings.

The system provides all of its object properties as elements that are accessible as standard data types. This allows the user and program objects to effectively use any property. A preferred embodiment of the data species specification used in the present invention is described in Appendix O, the New DataSpecies. These properties are then exposed as eXtended Markup Language (XML) for manipulation by other tools, in the manner described in more detail in Appendix P (Dataspecies in XML), Appendix S (XML Import and Export). Appendix T is a source code listing of a preferred XML Database according to the present invention.

The system requires a means to allow a user to create custom objects for some applications. In order to meet this need a Script Language is defined that exposes the system in a program object for user access and control. This language is simple, uses standard object links, has access to the library and provides a full debugger. A preferred embodiment of a script which may be used according to the present invention is described in more detail in Appendix Q (Script Design), and in further detail in Appendices V and W.

The present invention also applies the compound document paradigm of the Internet to control systems in a novel manner. This provides universal visibility of resources through a common Universal Resource Locator (URL). These resources are linked together to allow navigation creating a hyperlinked web of resources. The manner and advantages of this linking according to the present invention are disclosed in more detail in Appendix R, which is a white paper discussing component based and web-centric software.

Resources are managed by the system to ensure accessibility and validity. Resources in the system include class files, executables and DLLs, media, documentation, applications, property files, databases and logs, and third party software. One preferred embodiment of this aspect of the invention is disclosed in more-detail in Appendices V and W. A modified, more highly preferred embodiment of the resource management aspect of the invention is also discussed generally in Appendix U, Resource Management Design.

The control system must be usable by a wide audience including facility managers, application engineers and information specialists. The operation of the control system is described in more detail in Appendix V, Niagara™ Documentation Set. In general, the system provides a novel and unique control interface including a customized browser interface for accessing objects and information. As shown in Appendix V, this interface includes a workspace display, workspace editor, properties display, links display, and help feature. The user can issue commands to any object or system, and change operating characteristics and properties through this control interface.

As noted above, Appendix W provides detailed source code listings for the preferred embodiment of the present invention, including each of the components according to the present invention, and details of a set of Java objects used by the system. Numerous additional desirable features are disclosed in Appendix W, and those skilled in the art will more fully appreciate the advantages and structure of these additional features upon careful review of Appendix W.

By collapsing the information management and real-time expert control system into a common workstation, BAS architecture according to the present invention is simplified and the customer is provided with a single point of access to both information and control. The Web BAS Server platform provides a common graphical user interface based on the Java-enabled Web browser technology for all facility management information and building control applications. In addition, this open unified software environment provides consistent configuration tools for the information/fieldbus networks and control system applications over Internet with any industry standard browser.

The Web BAS Server platform as disclosed herein is the BAS industry's first software technology to integrate the different BACnet, LonMark, and Internet/CORBA standards into a common object model application environment supported through the Java-enabled Web browser interface. This embodiment also has integrated network management tools to support the BAS field contractor channels in the planning, design, configuration, installation, and maintenance of the BACnet/LonMark/Internet/CORBA system networks.

The very scalable Web BAS Server software can be used on small buildings as a single user front-end platform attached directly to the BACnet/LonMark fieldbus. On large BAS facilities, the Web BAS Server can be configured to supervise many Network Processors connected over Ethernet and support unlimited remote Web browser operator interface users. For corporate customers, the Web BAS Server can be configured to integrate the BAS architecture into the IBM enterprise information infrastructure and/or the Groupe Schneider industrial/power system architecture.

One significant feature of the invention is the development of a BAS controller module (Network Processor). Traditional proprietary BAS controller platforms have had too little memory, speed, and throughput to support multiple building service applications. Therefore, each application such as HVAC and Access Control has been provided using separate controllers that subdivide the user's real problem into solvable standalone products, but not with a comprehensive solution. This has resulted in increased installation costs and very little integration between the incompatible standalone building service solutions.

These limitations are overcome in the present invention by connecting BAS controller processor technology and an interoperable BACnet/LonMark fieldbus. To exploit this new high-performance technology, the invention employs application development capabilities that take advantage of the available processing power. Integration and multiple building service applications can thus be performed by the same computing platform.

To overcome the limited application development capabilities of today's BAS controllers, the Network Processor in the present invention employs a Java application environment based on object-oriented analysis, design, and programming. The NP uses a powerful Java object/rule engine based on Sun's JavaSoft technology to integrate multiple high level building service applications and support multi-vendor fieldbus solutions. Examples of Network Processor applications include global alarming, global scheduling, trending I data collection, diagnostic services, and demand limiting/power management to integrate popular building service products.

The Network Processor (NP) object software environment is preferably provided on an embedded controller hardware platform. The NP platform package supports the multi-vendor LonMark fieldbus and also provides Ethernet peer-to-peer networking to other NPs and the Web BAS Server (See FIG. 1—BACnet/LonMark/Internet Architecture).

The present invention provides three embodiments of Field Controller (FC) platforms as shown in the Figures and Appendices. The FC platforms preferably use 32-bit processors and may optionally connect through an Echelon coprocessor to the interoperable BACnet/LonMark fieldbus. These platforms use a real-time operating system that supports the Java object/rule engine for applications. The FCs are configured by the Web BAS Server over the fieldbus or through the FC's local RS 232/modem port or the video modem interface.

The first FC package supports locally attached terminal block input/output modules made by Groupe Schneider. This integrated design approach is very flexible and cost effective for high end industrial and commercial controller applications. The BACnet/LonMark object/rule engine can use any local input/output data or any fieldbus device data in its powerful application environment.

The second 32-bit Field Controller platform attached to the fieldbus does not support local attached input/output, but includes an integrated inexpensive programmable operator interface and the BACnet/LonMark object engine. The Web BAS Server configuration tool can program the flexible operator interface that has control and data access to any node device on the fieldbus network.

The third embodiment of the Field Controller package is integrated with a video cable modem to provide a low cost Internet connection to small buildings for remote control and monitoring by the Web BAS Server.

Operating elements of the system are each modeled as an object to simplify integration and usage. This includes user presentation, network management, network control, real-time control and device objects. The object model according to the present invention is described in further detail in Appendix A, which is a white paper describing the operation of a building automation system according to the present invention using distributed objects.

As another feature of the invention, to avoid the relatively high cost of a full-time internet connection for a client or a long distance telephone call from the server to a client, the server uses a simple dial-up notification mechanism to cause the client to open a connection back to the server. In operation, the server dials a modem attached to the client and terminates the call before the client answers. The client recognizes this as a server requesting contact. In response to the call, the client dials a local ISP with which it has a low-cost monthly service account. The client then establishes a connection to the server over the internet. This mechanism avoids per call or per minute charges by limiting access charges to the monthly fee charged by the ISP.

Thus, a control system and methods has been shown that uses object-oriented software to integrate BACnet, LonMark, CORBA, Java and Internet systems into a common object model of distributed applications in a multi-vendor open system environment supporting multiple industry standards. The control system and methods of the present invention provide both pre-defined objects and user-defined objects in a single control system. Integrity and persistence of system data is maintained and distributed through the use of archiving and synchronization techniques. Properties associated with a device are updated dynamically to reflect external interface characteristics of the device.

The attached Appendices form an integral part of the specification of the present application, and are to be read in conjunction with the specification and drawings. The contents of the Appendices are as follows:

Appendix A: BAS with Distributed Objects Whitepaper
Appendix B: Large Building BACnet/LonMark/CORBA/Java—Internet Architecture
Appendix C: R emote Small Building Monitoring and Control over Internet/Cable Network
Appendix D: Niagara™ Software Architecture
Appendix E: Remote Small Building Monitoring and Control over Internet Cable/ADSL Network
Appendix F: Prism™ Requirements and Design
Appendix G: Niagara™ Core Class Hierarchy
Appendix H: Tridium™ Enterprise Network Architecture
Appendix I: SPEC-001™ System Specification
Appendix J: Prism™ Design
Appendix K: Large Building BACnet/LonMark/CORBA/Java—Internet Architecture
Appendix M: Control Engine Design
Appendix N: Developer Notes 14 Mar 98-MailService
Appendix O: The New DataSpecies
Appendix P: Dataspecies in XML
Appendix Q: Script Design
Appendix R: A Whitepaper on Component Based/Web Centric Software
Appendix S: XML Import and Export
Appendix T: XML Database
Appendix U: Resource Management Design
Appendix V: Niagara™ Documentation Set
Appendix W: Source Code Listings
Appendix X: Properties Reference
Appendix Y: Pre-Defined Objects Reference

What is claimed is:

1. An object-oriented control system comprising:

clients for providing access to and control and monitoring of the object-oriented control system via an electronic network;

foreign devices not directly controllable by using downloadable Java-based objects;

stations for integrating said foreign devices into the object-oriented control system using a common object model, supervising other stations, and serving as master of the local system wherein a master provides persistent backup of all configuration information; and a flexible and open architecture capable of supporting a plurality of diverse configurations of said clients, foreign devices, and stations;

a real-time synchronization manager to regulate the orderly and timely execution of multiple tasks;

a plurality of user-defined objects;

a plurality of object properties;

a plurality of object categories;

an object creation facility to allow user creation and modification of said objects and said properties according to a plurality of said object categories;

a multi-level security facility;

a plurality of pre-defined objects coexisting with said user-defined objects;

a persistent and real-time information synchronization manager that maintains the integrity of system data throughout the object-oriented control system through the use of archiving and synchronization;

a control engine for providing predictable order of execution of said objects; and a programmable mail service for sending email notifications containing real-time data to remote sites.

2. The object-oriented control system recited in claim 1 wherein said object creation facility further comprises a dynamic device external interface update capability for dynamically updating or adding external interface object properties associated with said foreign devices.

3. The object-oriented control system recited in claim 1 further comprising a remote host to and control and monitoring of the object-oriented control system from a location not physically collocated with the other components of the object-oriented control system.

* * * * *

UNITED STATES PATENT AND TRADEMARK OFFICE
CERTIFICATE OF CORRECTION

PATENT NO. : 6,832,120 B1  
DATED : December 14, 2004  
INVENTOR(S) : Gerald L. Frank et al.

Page 1 of 1

It is certified that error appears in the above-identified patent and that said Letters Patent is hereby corrected as shown below:

Title page,
Item [75], Inventors, please delete "Ottie E. Allgood, Mechanisville, VA (US)" and substitute -- Ottie E. Allgood, Mechanicsville, VA (US) --.

Signed and Sealed this

Twelfth Day of April, 2005

JON W. DUDAS
*Director of the United States Patent and Trademark Office*